(12) United States Patent
Svoboda et al.

(10) Patent No.: US 7,506,403 B2
(45) Date of Patent: Mar. 24, 2009

(54) BLOWER/VAC DEBRIS COLLECTION SYSTEM WITH COLLECTION BAG ON MOVABLE WHEELED CART

(75) Inventors: Steven J. Svoboda, Bloomington, MN (US); Daniel R. Shemon, St. Louis Park, MN (US); Mark A. Pankratz, Minneapolis, MN (US); James R. Baumann, Henderson, NV (US)

(73) Assignee: The Toro Company, Bloomington, MN (US)

( * ) Notice: Subject to any disclaimer, the term of this patent is extended or adjusted under 35 U.S.C. 154(b) by 603 days.

(21) Appl. No.: 10/795,789

(22) Filed: Mar. 8, 2004

(65) Prior Publication Data

US 2005/0193517 A1 Sep. 8, 2005

(51) Int. Cl.
*A47L 9/10* (2006.01)
(52) U.S. Cl. ............................ 15/347; 15/352; 15/360; 15/DIG. 8; 55/DIG. 2
(58) Field of Classification Search .................. 15/347, 15/352, 360, DIG. 8; 55/DIG. 2; *A47L 9/10*
See application file for complete search history.

(56) References Cited

U.S. PATENT DOCUMENTS

| | | | | |
|---|---|---|---|---|
| 4,335,897 | A | * | 6/1982 | Muller, Jr. ............... 280/47.18 |
| 5,291,722 | A | * | 3/1994 | Schweigert ................. 56/203 |
| RE36,627 | E | | 3/2000 | Pink |
| 2003/0131435 | A1 | * | 7/2003 | Madhat ..................... 15/246.2 |

OTHER PUBLICATIONS

Black & Decker BV-006 Leaf Collection System materials (undated but admitted prior art).

* cited by examiner

*Primary Examiner*—David A Redding
(74) *Attorney, Agent, or Firm*—James W. Miller (57) ABSTRACT

A debris collection system for use with a portable, hand held blower/vac comprises a wheeled cart. A collection bag is releasably carried on the cart. A connecting hose releasably couples the collection bag to the fan outlet of the blower/vac to fill the collection bag with debris picked up by the blower/vac when the blower/vac operates in the vacuum mode. The cart rolls on the ground and trails behind the blower/vac in the manner of a canister vacuum cleaner as a user operates the blower/vac and walks forwardly with the blower/vac. The collection bag may be a reusable fabric bag or a disposable paper bag.

14 Claims, 12 Drawing Sheets

BLOWER/VAC DEBRIS COLLECTION SYSTEM WITH COLLECTION BAG ON MOVABLE WHEELED CART

TECHNICAL FIELD

This invention relates to a debris collection system for use with a portable, hand held blower/vac for receiving and collecting debris which has been picked up by the blower/vac when the blower/vac is operated in its vacuum mode. More particularly, this invention relates to a debris collection system having a collection bag carried on a movable, wheeled cart.

BACKGROUND OF THE INVENTION

Portable blower/vacs are well known lawn and garden implements which are used for blowing or picking up various debris, such as leaves, grass clippings, etc. A typical blower/vac of this type comprises a housing that encloses an electric motor having a rotatable shaft. A fan is connected to the shaft of the motor and rotates when the motor is driven. As the fan rotates, air is drawn in through a fan inlet on the housing and is ejected from a fan outlet on the housing. A handle is provided on the housing to allow a user to grip and hold the blower/vac during use.

The blower/vac can be operated in both a blowing mode and a vacuum mode. In the blowing mode, a blower tube is coupled to the fan outlet to direct the air stream being ejected from the fan outlet in a desired direction, such as against the ground to blow leaves off a sidewalk or the like. In the vacuum mode, a vacuum tube is coupled to the fan inlet. When the vacuum tube is positioned adjacent the ground, the vacuum tube will suck or pick up leaves or other debris and the blower/vac will then eject such debris through the fan outlet.

In known blower/vacs operating in the vacuum mode, a small debris collection bag may be coupled directly to the fan outlet of the blower/vac. This collection bag typically has a strap or sling to hang the collection bag from the body of the user as the user operates the blower/vac. The debris being ejected from the fan outlet of the blower/vac is deposited in the collection bag. When the collection bag is full, the user unslings the collection bag from the user's body, disconnects the collection bag from the fan outlet, unzips a zipper provided in the bag, and then dumps the debris out of the bag into a trash can, plastic disposable trash bag or compost pile. The user can then close the collection bag and again sling the collection bag about the user's body to continue picking up and collecting debris.

This type of collection bag for a blower/vac is effective but has some disadvantages. Since the bag is carried on the user's body, it is necessarily somewhat limited in size. Thus, it must frequently be emptied when a lot of debris is being quickly picked up by the blower/vac. The need to frequently empty such a relatively small collection bag can be an annoyance.

Moreover, because the typical collection bag is slung from the user's body, the weight of the collection bag as it fills as well as dust emitted from the debris being collected by the collection bag can be bothersome to some users. In addition, the collection bag can also restrict the movement of the user or get in the way of the user as the user operates the blower/vac. This is also bothersome to some users. Accordingly, there is a need in the art for a debris collection system that can efficiently collect larger quantities of debris and that will be easy to use without encumbering movement of the user's body.

SUMMARY OF THE INVENTION

One aspect of this invention relates to a debris collection system for use with a portable blower/vac having a fan outlet through which debris is ejected when the blower/vac is operated in a vacuum mode. The debris collection system comprises a collection bag having a longest dimension. A connecting hose releasably couples the collection bag to the fan outlet of the blower/vac. A wheeled cart is provided for releasably receiving the collection bag and for supporting the collection bag with the longest dimension of the collection bag extending more horizontally than vertically.

Another aspect of this invention relates to a debris collection system for use with a portable blower/vac having a fan outlet through which debris is ejected when the blower/vac is operated in a vacuum mode. The debris collection system comprises a collection bag. A connecting hose releasably couples the collection bag to the fan outlet of the blower/vac. A wheeled cart is provided for releasably receiving the collection bag and for supporting the collection bag for movement over the ground. The cart has a longest dimension that is generally horizontal relative to the ground.

Another aspect of this invention relates to a debris collection system for use with a portable blower/vac having a fan outlet through which debris is ejected when the blower/vac is operated in a vacuum mode. The debris collection system comprises a wheeled cart. A collection bag is releasably carried on the cart. A connecting hose releasably couples the collection bag to the fan outlet of the blower/vac to fill the collection bag with debris picked up by the blower/vac when the blower/vac operates in the vacuum mode. The cart is configured to roll on the ground and trail behind the blower/vac in the manner of a canister vacuum cleaner as a user operates the blower/vac and walks forwardly with the blower/vac.

Yet another aspect of this invention relates to a debris collection system for use with a portable blower/vac having a fan outlet through which debris is ejected when the blower/vac is operated in a vacuum mode. The debris collection system comprises a collection bag. A connecting hose releasably couples the collection bag to the fan outlet of the blower/vac. A wheeled cart releasably receives the collection bag and supports the collection bag for movement over the ground. The connecting hose is coupled to the cart at a location that allows the cart to be pulled by the connecting hose and to roll and trail behind the blower/vac as a user operates the blower/vac and walks forwardly with the blower/vac.

Another aspect of this invention relates to a debris collection system for use with a portable blower/vac. The debris collection system comprises a reusable collection bag made of a relatively permanent fabric material, the reusable collection bag being configured to allow air to pass out of the collection bag as the collection bag collects debris. A connecting hose releasably couples the reusable collection bag to the blower/vac. A wheeled cart is provided for releasably receiving the reusable collection bag and for supporting the reusable collection bag. A disposable collection bag is made of paper, the disposable collection bag being configured to allow air to pass out of the collection bag as the collection bag collects debris and the disposable collection bag being selectively used on the cart in place of the reusable collection bag.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

This invention comprises a debris collection system 2 for use with a portable, hand held blower/vac 4 when blower/vac 4 is operated in its vacuum mode. In the vacuum mode, a rigid vacuum tube 6 is releasably coupled to the fan inlet of blower/vac 4. When blower/vac 4 is turned on and the fan is rotated, a vacuum is developed at the fan inlet. This vacuum is used by vacuum tube 6 to suck or pick up debris from the ground, such as leaves, twigs, grass clippings, etc. Such debris is ejected from blower/vac 4 through the fan outlet 8 of blower/vac 4.

Hand held blower/vacs 4 of this type are well known in the lawn and garden industry and have long been manufactured and sold by The Toro Company, the assignee of this invention, under such brand names as the Super Blower. A blower/vac 4 of the type with which this invention may be used is disclosed in U.S. Pat. No. Re 36,627, which patent is owned by The Toro Company and is hereby incorporated by reference. The reader of this patent application may refer to U.S. Pat. No. Re 36,627 or to the blower/vacs previously manufactured and sold by The Toro Company for the details of the structure and operation of such a blower/vac 4. Accordingly, blower/vac 4 shown herein need not be further described.

Debris collection system 2 of this invention comprises a wheeled cart 10, a collection bag 12, and a connecting hose 14 for releasably connecting collection bag 12 to fan outlet 8 of blower/vac 4. Each of these components will be described in turn.

The Wheeled Cart

Cart 10 is supported for movement over the ground by a pair of laterally spaced apart ground engaging wheels 16. Wheels 16 are rotatably journalled on the ends of a transverse axle 18 carried on an axle assembly 20 attached to cart 10. Each wheel 16 lies along one side of cart 10. Cart 10 includes a pair of short, upwardly extending side walls 22 with side walls 22 being laterally spaced apart from one another and located on opposite sides of cart 10. Each side wall 22 is part of axle assembly 20 and is located immediately inboard of each wheel 16. Thus, each side wall 22 also acts somewhat as a fender to prevent contact between opposite sides of collection bag 12 and wheels 16.

Figure 1:
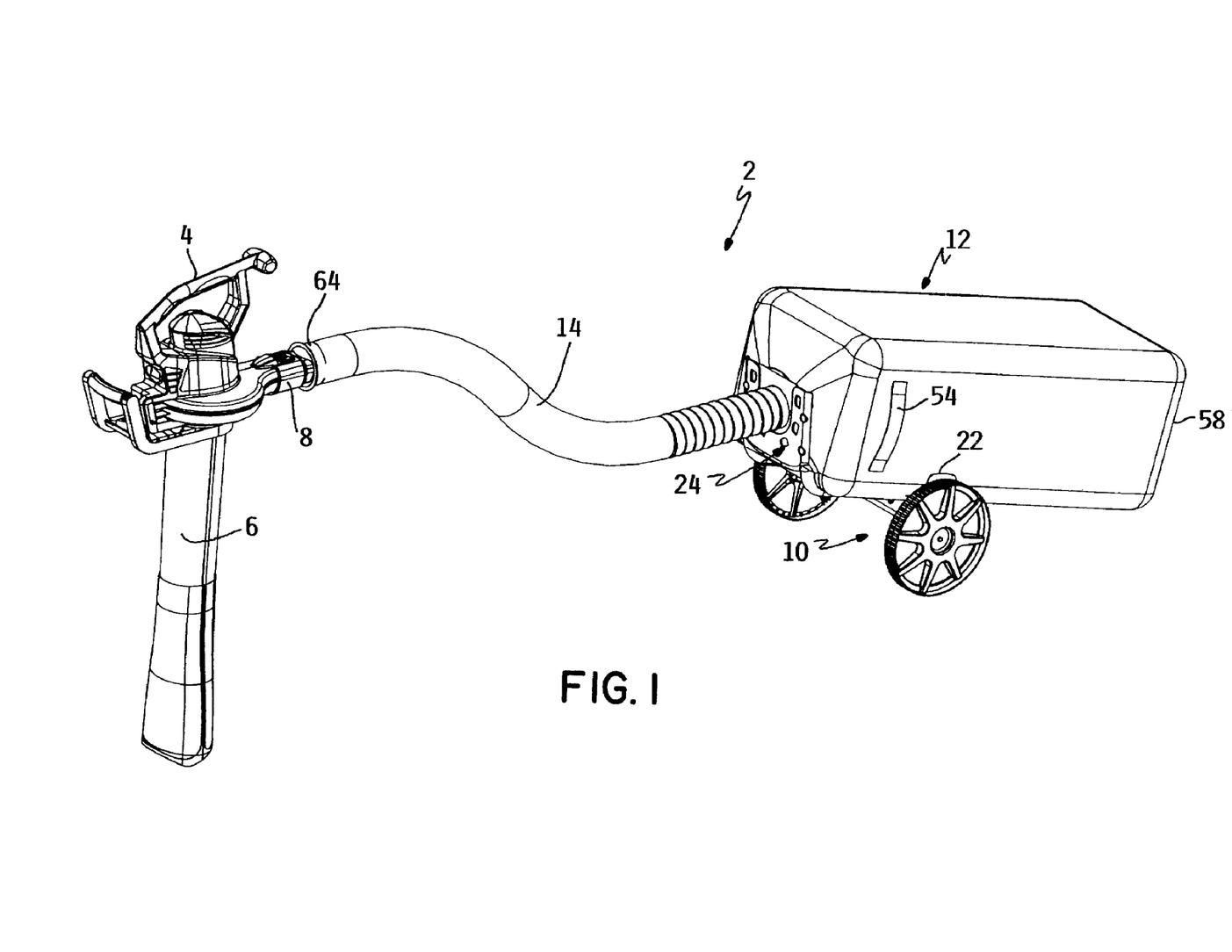
FIG. 1 is a perspective view of a debris collection system according to this invention comprising a connecting hose, collection bag, and wheeled cart, particularly illustrating the debris collection system in an assembled form connected to the fan outlet of a blower/vac.
Figure 3:
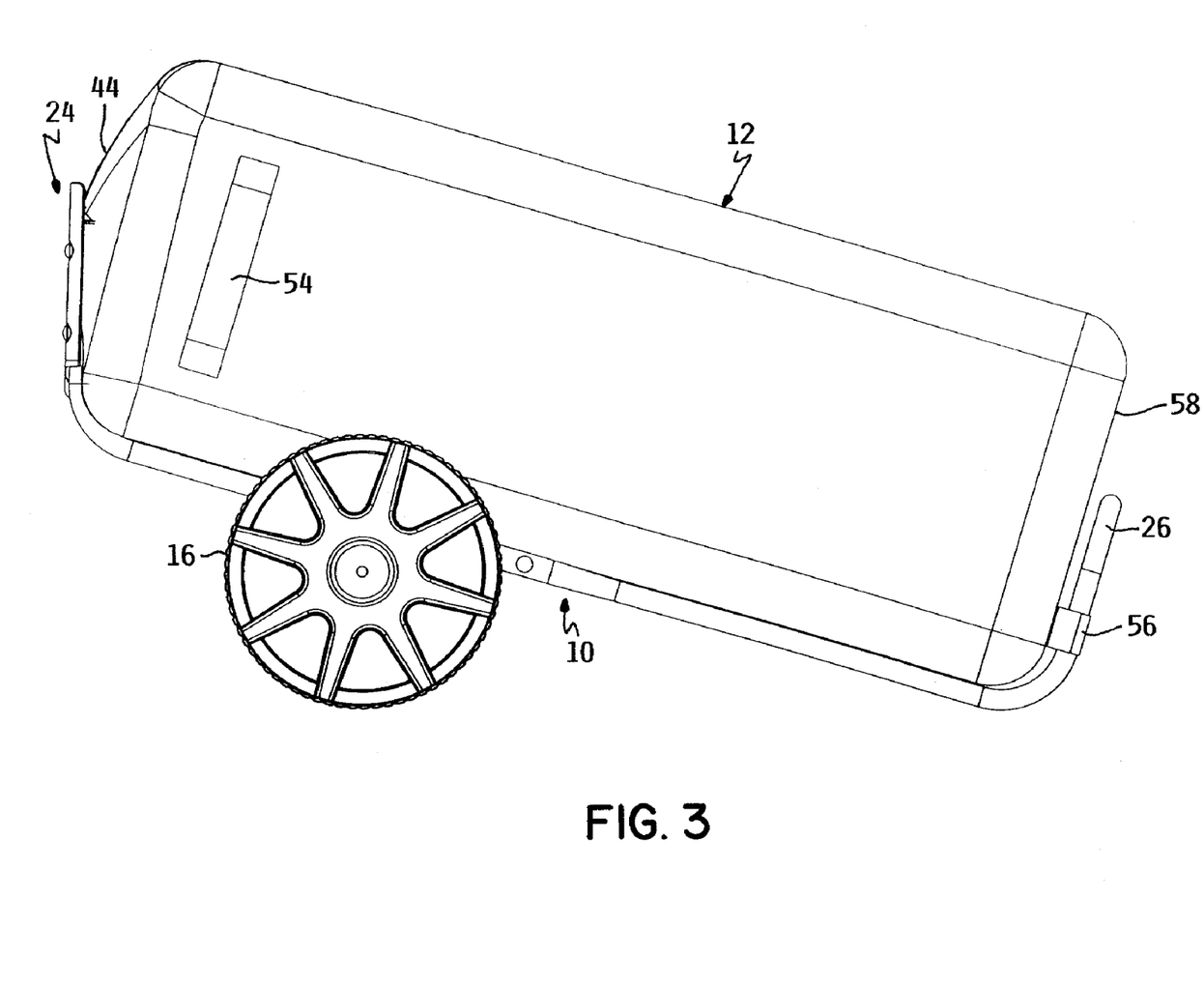
FIG. 3 is a side elevational view of portions of the debris collection system of FIG. 1, particularly illustrating the collection bag installed on the wheeled cart of the debris collection system.

Cart 10 includes an upwardly turned front end 24 and an upwardly turned rear end 26. The front and rear ends 24 and 26 of cart 10 are generally planar in longitudinal cross-section, have about the same height as each other and are generally parallel to one another though front end 24 of cart 10 inclines slightly forwardly relative to rear end 26 as front end 24 extends upwardly. See FIG. 3. The front and rear ends 24 and 26 and side walls 22 of cart 10 provide an upwardly facing cavity for receiving the lower portion of collection bag 12 as will be described in more detail hereafter. See FIG. 1.

Cart 10 has a length $l_c$ between the front and rear ends 24 and 26, a width $w_c$ between side walls 22, and a height $h_c$ defined by the height of the higher of the front and rear ends 24 and 26. Cart 10 is longer than it is wide or high, i.e. the cart length $l_c$ is the longest dimension of cart 10.

Figure 4:
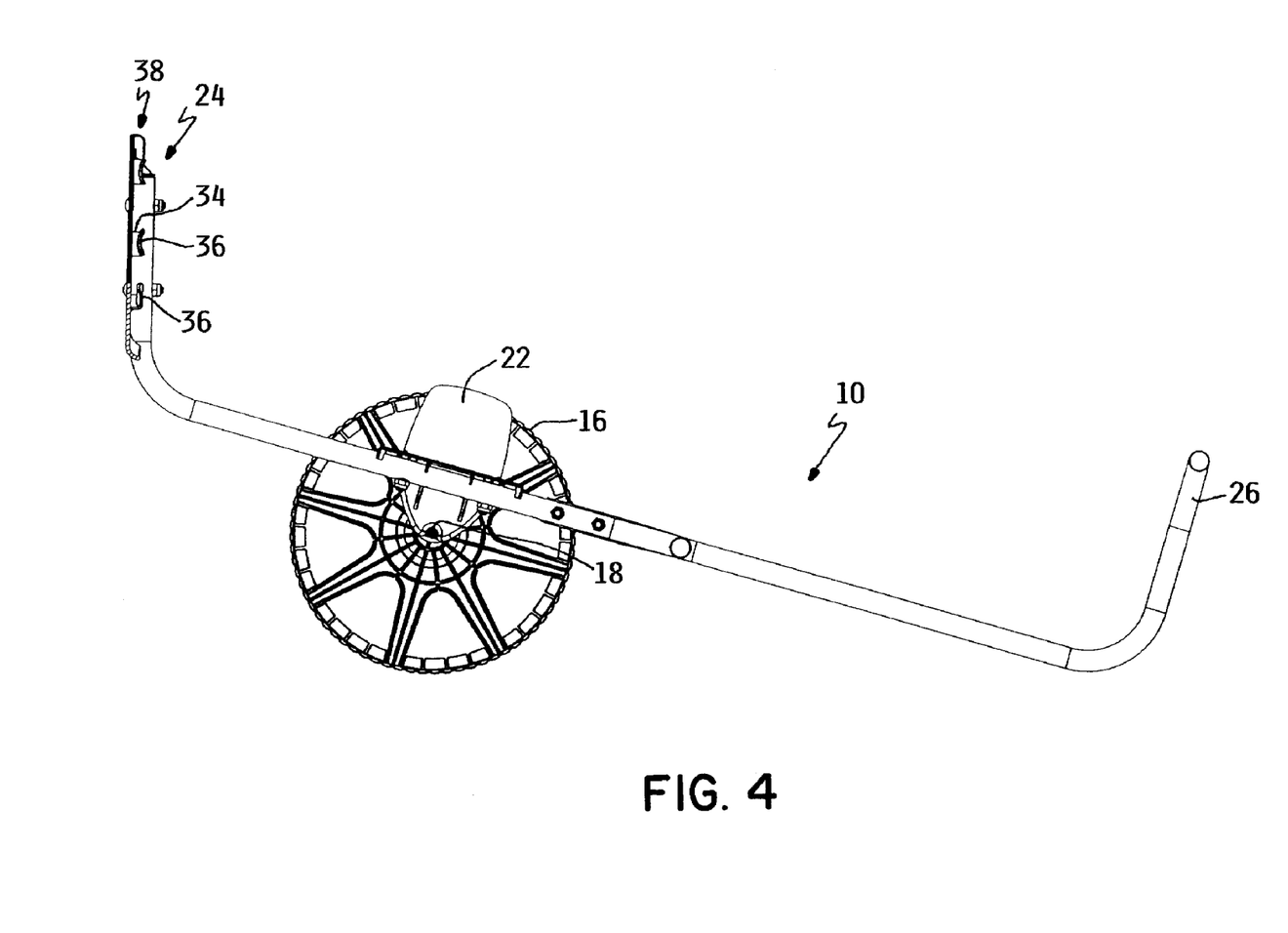
FIG. 4 is a longitudinal cross-sectional view of the wheeled cart that is part of the debris collection system of FIG. 1.

Front end 24 of cart 10 has a vertical slot 28 in its upper edge with slot 28 extending down over much of the height of front end 24 of cart 10. Slot 28 has a substantially straight upper portion 30 and a semi-circular bottom portion 32. A plurality of L-shaped tabs 34 are punched out of front end 24 of cart 10. The free ends 36 of tabs 34 all point inwardly towards slot 28 and are spaced behind front end 24 of cart 10 at a substantially constant distance. Thus, tabs 34 form a slideway 38 adjacent to and behind slot 28 on front end 24 of cart 10. See FIGS. 4 and 15. The purpose of slot 28 and slideway 38 formed by tabs 34 will be described in more detail hereafter.

As is clearly shown in the drawings, wheels 16 are located closer to front end 24 of cart 10 than to the rear end of cart 10. Thus, cart 10 is unbalanced on wheels 16 and will normally be tipped or tilted with front end 24 of cart 10 being raised and the rear end of cart 10 being lowered. In fact, the rear end of cart 10 will normally rest on the ground during use of cart 10.

Figure 2:
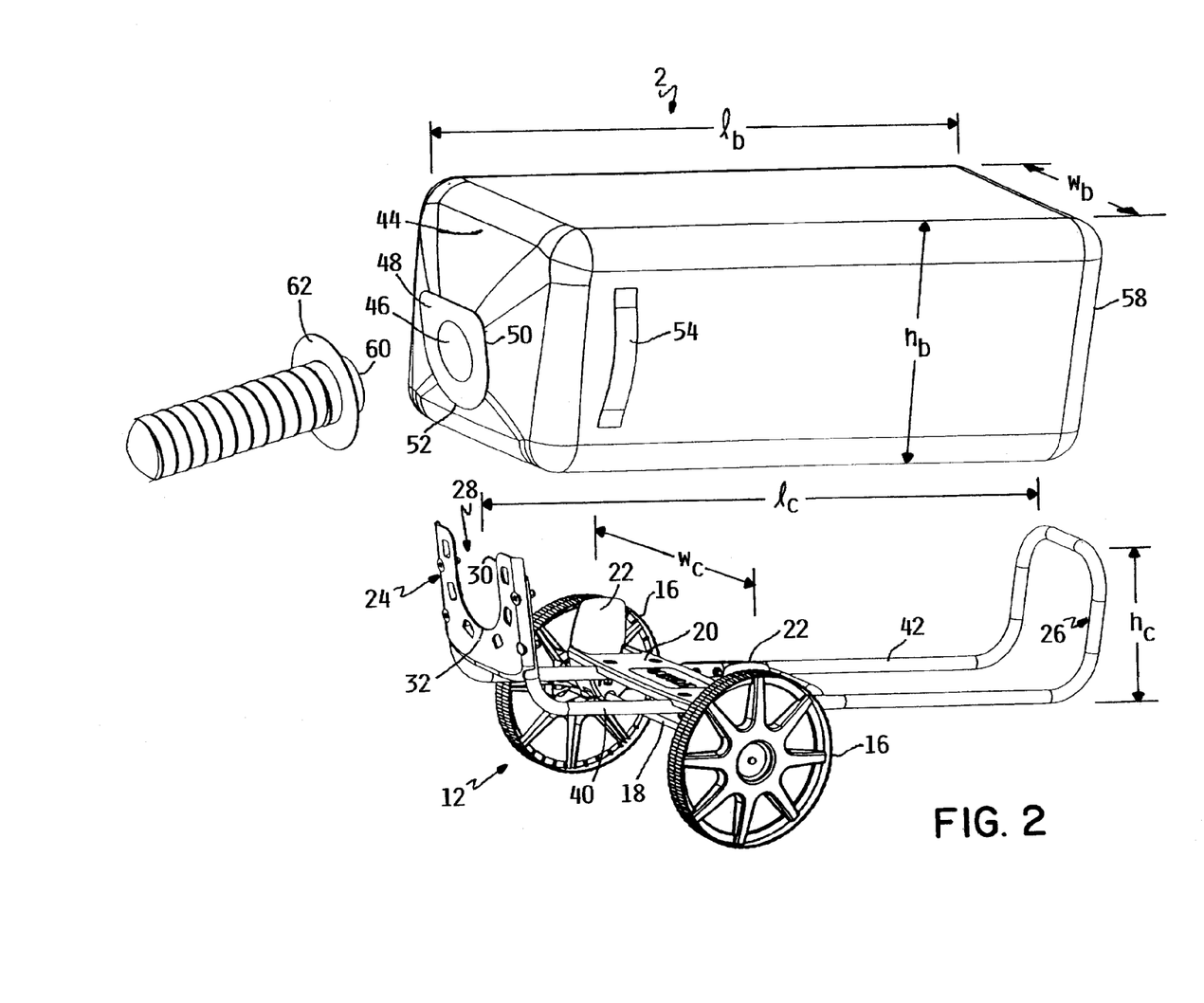
FIG. 2 is a perspective view of the debris collection system of FIG. 1, particularly illustrating the debris collection system in an exploded form.

As shown in FIG. 2, cart 10 is made of a U-shaped, tubular front subframe 40 and a U-shaped, tubular rear subframe 42 bolted to front subframe 40. Thus, cart 10 can be shipped in an unassembled, knock down form and then assembled by the purchaser. For example, wheels 16 and axle assembly 20 can be shipped unassembled from each other and from front subframe 40. The purchaser will first install wheels 16 on each end of axle 18 and then slip axle assembly 20 over the closed U-shaped end of front subframe 40 until axle assembly 20 reaches the location where it is to be bolted to front subframe 40. After axle assembly 20 is then bolted to front subframe 40, the free ends of the tubular legs of rear subframe 42 can then be bolted to the sides of the tubes forming the closed U-shaped end of front subframe 40.

However, cart 10 is not limited to being tubular in form or in being made from tubular front and rear subframes 40 and 42 that are bolted together. Cart 10 could be made of other suitable materials and by other methods of manufacture.

The Collection Bag

Collection bag 12 is made of a relatively permanent, flexible and breathable fabric material of the type often used for grass bags on lawn mowers or for shoulder slung leaf collection bags on hand held blower/vacs 4. This type of fabric material is well known to those in the lawn and garden industry. Thus, collection bag 12 is reusable.

The illustrations of collection bag 12 herein show collection bag 12 in an inflated form as it would look when it is receiving air flow from blower/vac 4. Normally, when collection bag 12 is not connected to blower/vac 4 or blower/vac 4 is not running, collection bag 12 would be deflated and would not have the appearance shown in the drawings. The inflated appearance is used simply to better illustrate the configuration of collection bag 12.

Collection bag 12 has a rectangular shape approximating the shape of cart 10. Collection bag 12 has a longest side or dimension along its length, denoted as $l_b$ in the drawings, which is slightly less than the length $l_c$ of cart 10. Collection bag 12 has a shorter dimension along its width, denoted as $w_b$ in the drawings, which is approximately the same as the width $w_c$ of cart 10. Thus, when collection bag 12 is inflated and is installed on cart 10, the lower portion of collection bag 12 will be received on cart 10 between upturned front and rear ends 24 and 26 of cart 10 and between upturned side walls 22. When so installed on cart 10, collection bag 12 can have a height $h_b$ that exceeds the height $h_c$ of cart 10.

Collection bag 12 has a front end 44 that is formed with a circular inlet 46 leading to the interior of collection bag 12. Debris picked up by blower/vac 4 will be deposited in collection bag 12 by passing through inlet 46. Inlet 46 is carried on a rigid attachment flange 48 on front end 44 of collection bag 12. Attachment flange 48 is shaped much like slot 28 on front end 24 of cart 10. Namely, attachment flange 48 has a straight upper portion 50 and a semi-circular bottom portion 52. Attachment flange 48 is designed to slide in and be retained by slideway 38 formed by tabs 34 on front end 24 of cart 10.

A pair of vertical side straps 54 are placed on collection bag 12 on each side of collection bag 12 generally adjacent front end 44 of collection bag 12. Only one such side strap 54 is shown on one side of collection bag 12 in the drawings. Side straps 54 can be gripped and held by the user to help manipulate collection bag 12, such as when the user is installing or removing collection bag 12 from cart 10.

In addition, a horizontal rear strap 56 is provided on the rear end 58 of collection bag 12. This rear strap 56 is designed to slip over rear end 26 of cart 10 when collection bag 12 is installed on cart 10 to prevent rear end 58 of collection bag 12 from sliding off cart 10. See FIG. 3 which shows rear strap 56 of collection bag 12 slipped over rear end 26 of cart 10. Rear strap 56 can also be gripped and held by the user when emptying collection bag 12 of accumulated debris.

Figure 9:
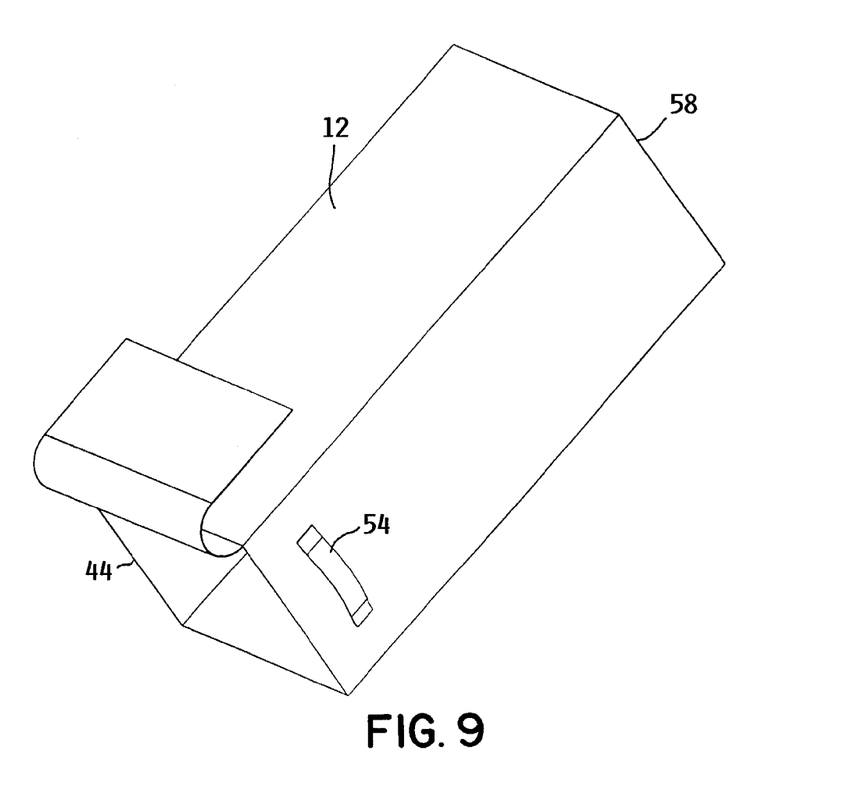
FIG. 9 is a perspective view of a portion of the debris collection system of FIG. 1, particularly illustrating the front end of the collection bag being unzipped and the collection bag being inverted to dump accumulated debris from the collection bag.

Front end 44 of collection bag 12 is connected to the remainder of collection bag 12 by a zipper along three sides thereof. When front end 44 of collection bag 12 is unzipped along these three sides, front end 44 of collection bag 12 will form a flap that will fold or hang out of the way when collection bag 12 is inverted and dumped. The accumulated debris in collection bag 12 will simply fall out of collection bag 12 through the opening formed by the unzipped front end of collection bag 12. See FIG. 9. As noted previously, rear strap 56 is useful for holding onto the rear end of collection bag 12 during this dumping process.

The Connecting Hose

Connecting hose 14 comprises an elongated length of flexible hose or tubing. Connecting hose 14 may be formed of any suitable flexible hose or tubing materials. Such hose or tubing materials are preferably impermeable to the passage of air through the sidewalls of the hose though cloth hose or tubing materials allowing the passage of some air through the sidewalls could be used. The precise type of hose or tubing material that is used is not important.

Figure 5:
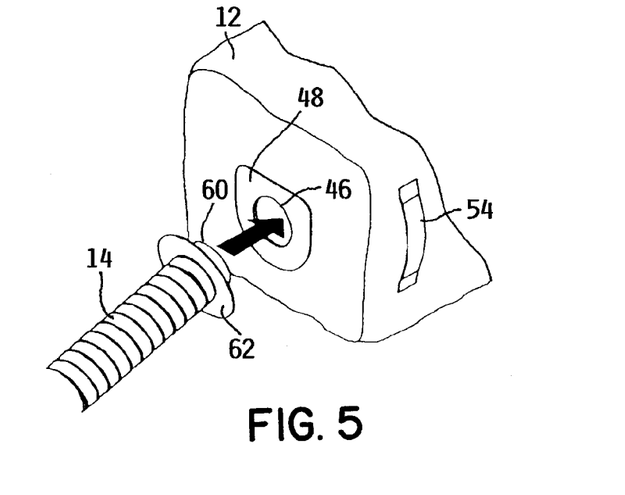
FIG. 5 is a perspective view of portions of the debris collection system of FIG. 1, particularly illustrating the insertion of the rear end of the connecting hose into the front end of the collection bag.
Figure 6:
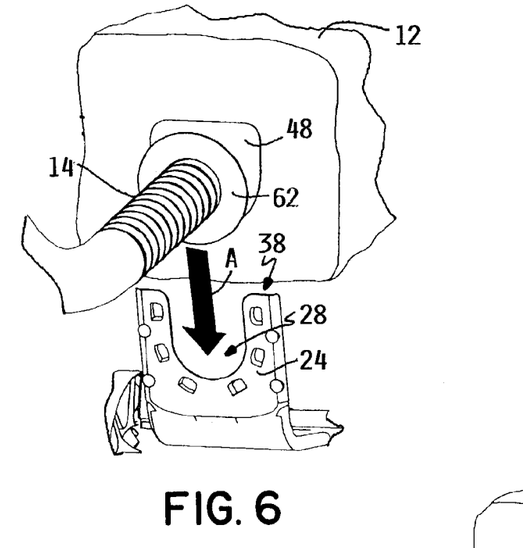
FIG. 6 is a perspective view of portions of the debris collection system of FIG. 1, particularly illustrating the abutment of an attachment plate on the rear end of the connecting hose with an attachment flange on the front end of the collection bag prior to the collection bag being installed on the wheeled cart.

As shown in FIG. 5, the rear end 60 of connecting hose 14 carries a circular attachment plate 62. The rear end 60 of connecting hose 14 is sized to slide through the circular inlet 46 and attachment flange 48 on collection bag 12. Thus, rear end 60 of connecting hose 14 is coupled to collection bag 12 simply by sticking rear end 60 through inlet 46 on collection bag 12 until attachment plate 62 on connecting hose 14 hits and abuts against attachment flange 48 on collection bag 12. FIG. 6 illustrates rear end 60 of connecting hose 14 having been connected to collection bag 12 with attachment plate 62 on connecting hose 14 being abutted against attachment flange 48 on collection bag 12. Rear end 60 of connecting hose 14 is not seen in FIG. 6 since rear end 60 is located within collection bag 12 in this view.

The front end 64 of connecting hose 14 is releasably coupled to fan outlet 8 of blower/vac 4. In Toro brand blower/vacs 4, fan outlet 8 normally includes a pair of receptacles 66 spaced 180° apart around fan outlet 8, with one receptacle 66 being on top of fan outlet 8 and the other receptacle 66 being on the bottom of fan outlet 8. Such receptacles 66 normally receive a pair of resilient locking tabs that are carried on a blower tube (not shown) of blower/vac 4 to releasably couple the blower tube to fan outlet 8. Such receptacles 66 and the resilient tabs that lock within the receptacles are well known in existing Toro brand blower/vacs 4 and are shown in U.S. Pat. No. Re 36,627, incorporated by reference herein.

In any event, front end 64 of connecting hose 14 carries a rigid coupler 68 that is shaped to slide over fan outlet 8 of blower/vac 4. Coupler 68 carries a pair of top and bottom resilient tabs 70 of the same type used on conventional blower tubes for Toro brand blower/vacs 4. These tabs 70 are designed to releasably mate with receptacles 66 already provided on fan outlet 8 of blower vac 4 in the same way as the conventional blower tube is connected to fan outlet 8. Thus, front end 64 of connecting hose 14 is coupled to fan outlet 8 of blower/vac 4 simply by sliding coupler 68 over fan outlet 8 until the resilient tabs 70 snap into receptacles 66. To remove connecting hose 14 from blower/vac 4, resilient tabs 70 are simply manually depressed to release tabs 34 from receptacles 66 and coupler 68 can then be pulled off fan outlet 8.

The Operation of the Debris Collection System

To use debris collection system 2 of this invention, the user needs to first connect connecting hose 14 to blower/vac 4 and to collection bag 12. In this regard, coupler 68 on front end 64 of connecting hose 14 is snapped onto blower/vac 4 over fan outlet 8. Rear end 60 of connecting hose 14 is then coupled or connected to front end 44 of collection bag 12. As described above, rear end 60 of connecting hose 14 is pushed through inlet 46 on front end 44 of collection bag 12 until attachment plate 62 on rear end 60 of connecting hose 14 abuts with attachment flange 48 on front end 44 of collection bag 12.

The coupled ends of connecting hose 14 and collection bag 12 are then inserted into cart 10. In this respect, attachment plate 62 and attachment flange 48, which are abutted against one another, are aligned with slideway 38 formed by tabs 34. See FIGS. 4 and 6. The user then slides the abutted attachment plate 62 and attachment flange 48 downwardly into slideway 28 with connecting hose 14 passing down through slot 28 in front end 24 of cart 10. Slideway 38 is deep enough, i.e. tabs 34 are spaced far enough away from slot 28, to receive the combined thicknesses of attachment plate 62 and attachment flange 48 in a relatively snug fit. However, even when so received, attachment plate 62 on connecting hose 14 is free to rotate within slot 28 even as connecting hose 14 is held within slot 28.

Figure 7:
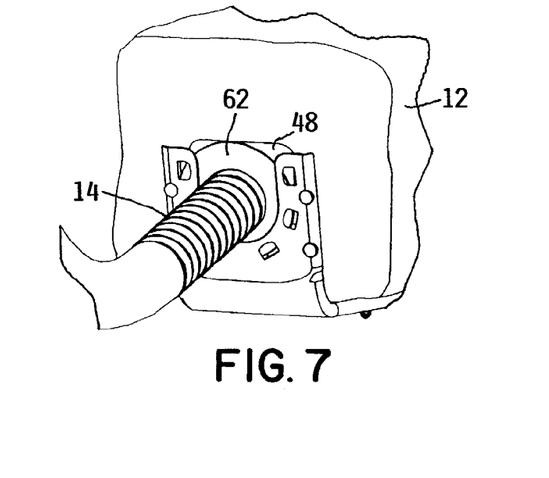
FIG. 7 is a perspective view of portions of the debris collection system of FIG. 1, particularly illustrating the attachment plate on the rear end of the connecting hose and the attachment flange on the front end of the collection bag being received in a slideway on the front end of the wheeled cart with the connecting hose passing through a vertical slot in the front end of the wheeled cart after the collection bag is installed on the wheeled cart.
Figure 8:
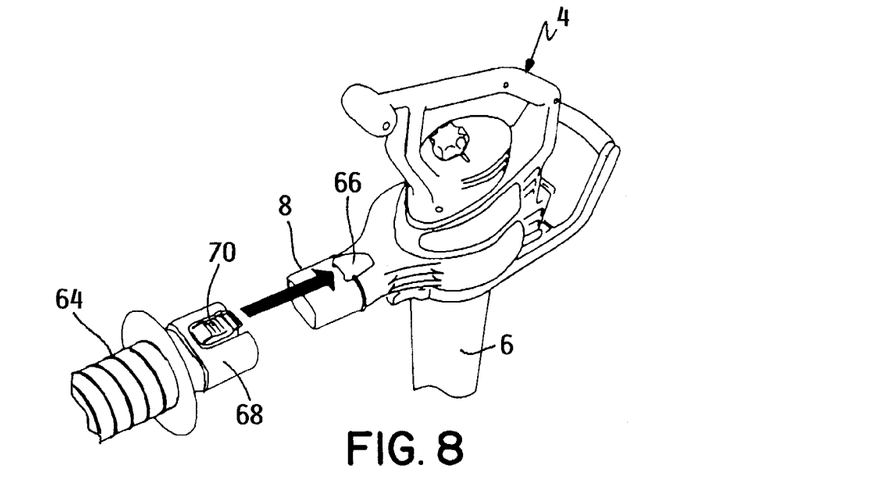
FIG. 8 is a perspective view of a portion of the debris collection system of FIG. 1, particularly illustrating a coupler on the front end of the connecting hose and the insertion of the coupler over the fan outlet on the blower/vac.

FIG. 6 illustrates the coupled ends of connecting hose 14 and collection bag 12 prior to their insertion in slideway 38. The coupled ends are inserted into slideway 38 in the direction of the arrow A in FIG. 6. FIG. 7 illustrates the same components after their insertion in slideway 38 with connecting hose 14 passing through slot 28 in front end 24 of cart 10.

Figure 15:
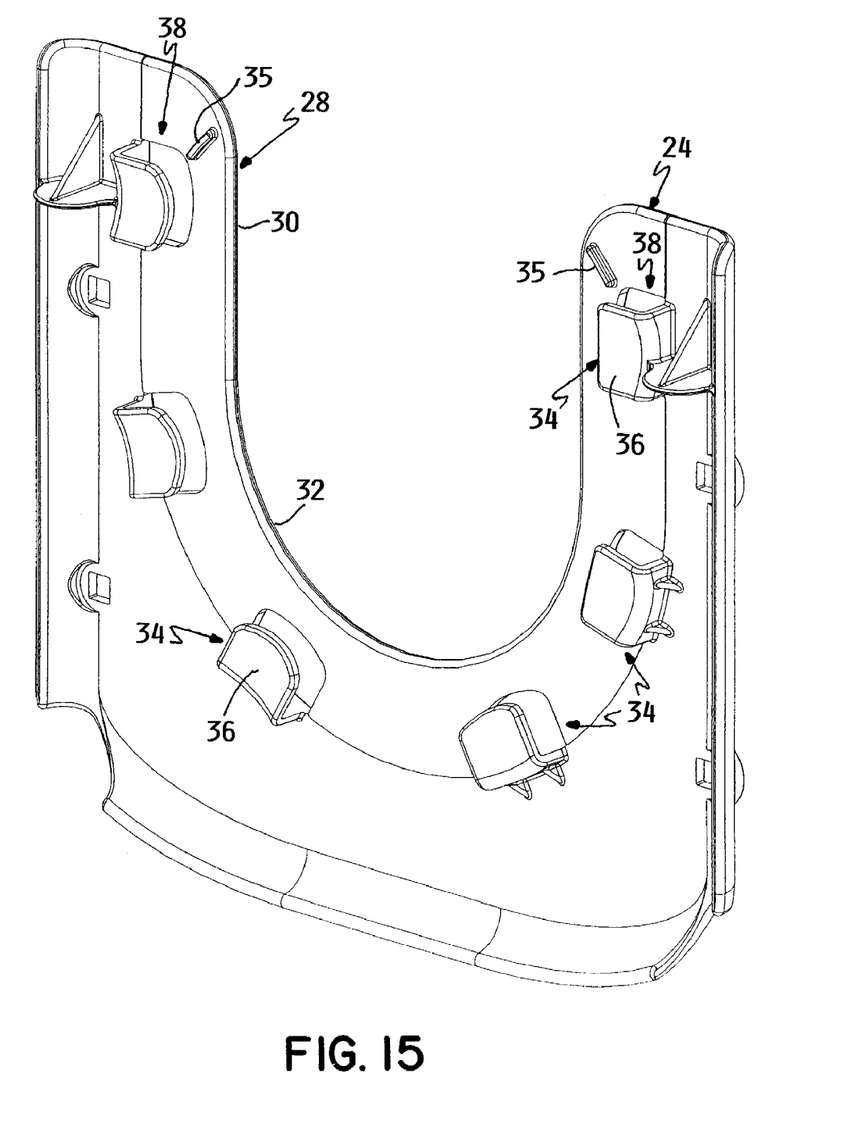
FIG. 15 is a perspective view of the front end of the wheeled cart portion of the debris collection system of FIG. 1, particularly illustrating the slideway formed by the L-shaped tabs and a pair of angled retention detents located at the top of opposite sides of the slideway.
Figure 16:
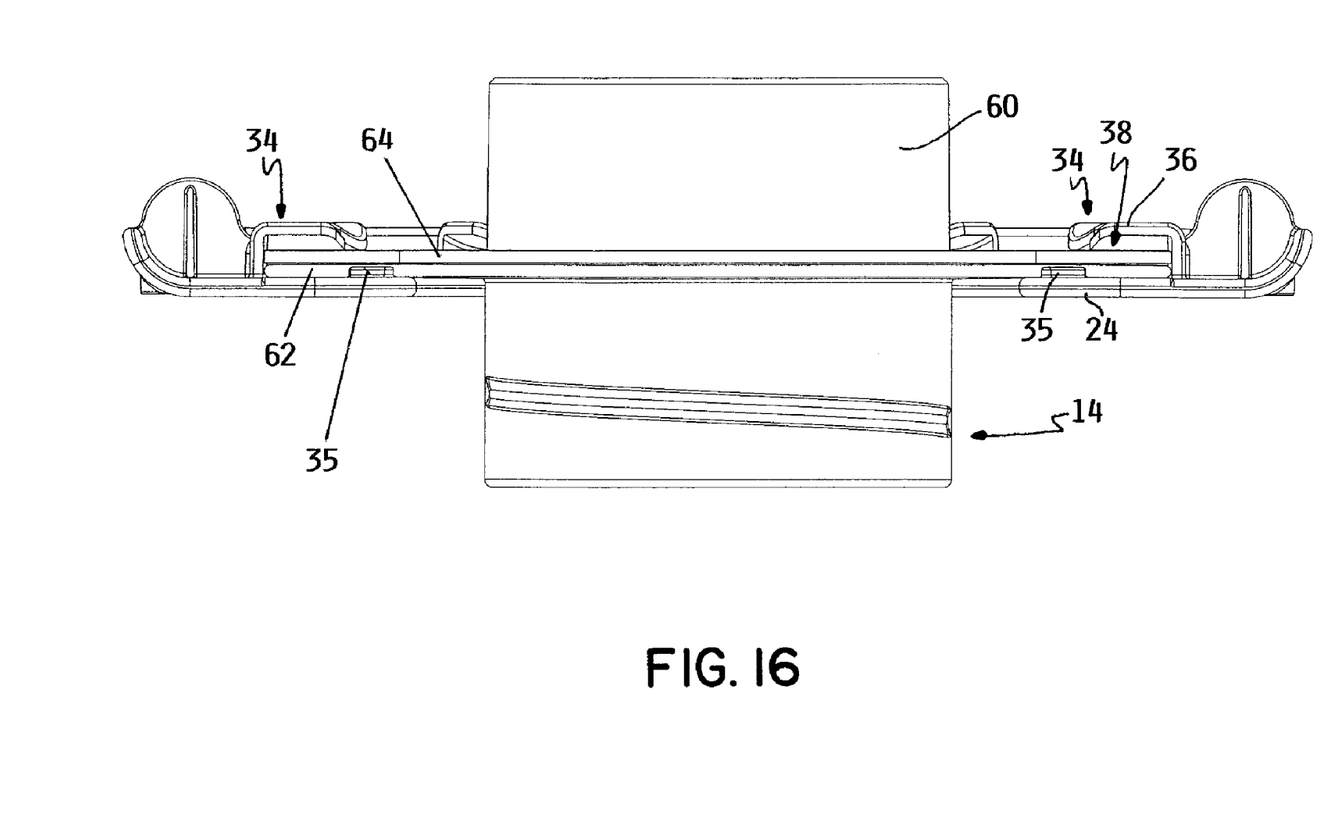
FIG. 16 is a top plan view of the front end of the wheeled cart as shown in FIG. 15, particularly illustrating the abutted attachment flange on the collection bag and the abutted attachment plate on the connecting hose inserted into the slideway on the front end of the cart with the retention detents engaging against the top of the attachment plate on the connecting hose.

Referring now to FIGS. 15 and 16, front end 24 of cart 10 includes a pair of angled retention detents 35 at the top of opposite sides of slideway 38. As the abutted attachment plate 62 and attachment flange 48 are slid down into slideway 38, there is enough lateral give or flex in front end 34 to permit attachment plate 62 to pass or snap downwardly past detents 35. Then, when attachment plate 62 and attachment flange 48 are fully received in slideway 38, detents 35 will rest or abut against the top of opposite sides of attachment plate 62 to help hold attachment plate 62, and hence attachment flange 48, within slideway 38. Obviously, the holding or retention force provided by detents 35 is small enough that the user can easily pull attachment plate 62 and attachment flange 48 up out of slideway 38 as part of the process for removing collection bag 12 from cart 10.

When front end 44 of collection bag 12 is inserted into cart 10 in the above-described manner, the rest of collection bag 12 will simply overlie the remainder of cart 10. As described earlier, rear end 58 of collection bag 12 can have its rear strap 56 hooked over rear end 26 of cart 10 to help secure rear end 58 of collection bag 12 to cart 10 as well. When fully installed on cart 10, collection bag 12 will have its lower portion received between front and rear ends 24 and 26 of cart 10 and between side walls 22 of cart 10. Collection bag 12 will be tilted downwardly towards rear end 58 of collection bag 12 in keeping with the normally tilted or downwardly inclined orientation of cart 10 towards rear end 26 of cart 10.

With debris collection system 2 installed in this manner, the user is free to operate blower/vac 4 in its vacuum mode to pick up debris through vacuum tube 6. This debris is ejected through fan outlet 8 and through connecting hose 14 into the interior of collection bag 12. The generally horizontal orientation of cart 10 and collection bag 12 means the center of gravity of debris collection system 2 is kept quite low so that the trailing cart 10 and collection bag 12 are not unwieldy or difficult to pull and maneuver. In fact, cart 10 will smoothly trail or follow behind the user somewhat in the manner of a canister vacuum cleaner as the user walks around using blower/vac 4. This is an advantage over prior art blower/vac debris collection systems.

In addition, because cart 10 inclines downwardly towards its rear end 26 due to the placement of wheels 16, front end 44 of collection bag 12, which contains inlet 46 for debris into collection bag 12, is elevated relative to rear end 58 of collection bag 12. This means that debris entering collection bag 12 will naturally fall and move towards rear end 58 of collection bag 12 to promote better and more even filling of collection bag 12.

While the unbalanced orientation of cart 10 is preferred, cart 10 and collection bag 12 could be designed to be horizontal with wheels 16 being placed at the middle of cart 10 or with multiple sets of wheels 16 used along the length of cart 10. Such a purely horizontal orientation of cart 10 and collection bag 12 would still have the advantageous handling characteristics described above. In addition, the number, placement and type of wheels 16 can be varied from that shown herein, e.g. some or all of the wheels could be caster wheels. Thus, the term "cart" as used herein is not limited to a vehicle with only two wheels.

Once collection bag 12 becomes filled with debris, it may be removed from cart 10 and emptied. This is done by lifting up on collection bag 12 using side straps 54 or the like to lift collection bag 12 off cart 10. Rear strap 56 may be unhooked either prior to lifting collection bag 12 or rear strap 56 may simply slide up and off rear end 26 of cart 10 to unhook itself as collection bag 12 lifts off cart 10. The coupled attachment plate 62 and attachment flange 48 will be lifted up out of slideway 38 and connecting hose 14 will lift up out of slot 28.

Once collection bag 12 clears cart 10, connecting hose 14 is disengaged from collection bag 12 by pulling rear end 60 of connecting hose 14 out of front end 44 of collection bag 12. After connecting hose 14 is removed in this manner, front end 44 of collection bag 12 is unzipped. The user may then partially invert collection bag 12. The accumulated debris will simply fall out of collection bag 12 through the now open front end of collection bag 12. Once collection bag 12 is emptied, front end 44 of collection bag 12 can be zipped back up and collection bag 12 can be reinstalled on cart 10 as described above for continued use.

In addition, cart 10 permits the user to lift up on rear end 26 of cart 10 and pull cart 10 around in the manner of a two wheeled, hand cart to help transport a loaded collection bag 12 from one site to another. If desired, cart 10 could also be configured to stand up or be self-supporting on front end 24 of cart 10.

The Universal Adapter

Not all hand held blower/vacs 4 have fan outlets 8 provided with a pair of mating receptacles 66 for releasably receiving resilient tabs 70 provided on coupler 68 used on front end 64 of connecting hose 14. Such receptacles 66 are found only on Toro brand blower/vacs 4.

Figure 10:
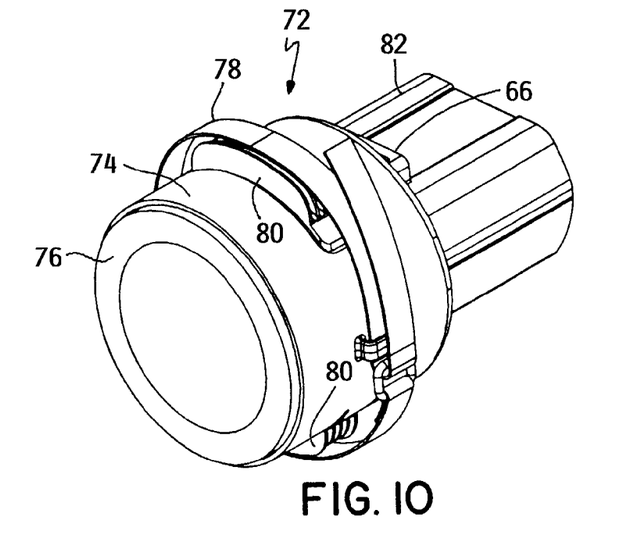
FIG. 10 is a perspective view of a universal adapter for use in coupling the debris collection system of FIG. 1 to other blower/vacs having fan outlets that are not designed to receive the connecting hose coupler that is shown in FIG. 8.

To increase the numbers of blower/vacs 4 with which debris collection system 2 of this invention can be used, a universal adapter 72 is provided for installing on fan outlets 8 of other blower/vacs 4. See FIG. 10. Universal adapter 72 has a front cylindrical end 74 that is large enough to slide over the fan outlets 8 of many other blower/vacs 4 on the market. Cylindrical end 74 carries a sleeve 76 of compressible foam or the like as well as a strap 78 that encircles cylindrical end 74 of universal adapter 72. When strap 78 is manually tightened by the user, strap 78 will compress two opposed clamps 80 against compressible sleeve 76 to compress sleeve 76 and seal sleeve 76 around fan outlet 8 of blower/vac 4. This sealing will occur regardless of the precise shape of the fan outlet 8 of blower/vac 4.

The rear end 82 of universal adapter 72 is shaped to mimic the shape of fan outlet 8 on a Toro brand blower/vac 4 and to provide a pair of opposed mating receptacles 66 like the receptacles 66 found on a Toro brand blower/vac 4. Thus, with universal coupler 72 installed on fan outlet 8 of a non-Toro brand blower/vac 4, front end 64 of connecting hose 14 can still be snapped into rear end 82 of universal adapter 72 in the same manner as it connects to a Toro brand blower/vac 4. This is done simply by sliding coupler 68 on front end 64 of connecting hose 14 over rear end 82 of universal adapter 72 until the resilient tabs 70 on coupler 68 snap into the mating receptacles 66 on rear end 82 of universal adapter 72. Thus, debris collection system 2 of this invention is usable with most if not all hand held blower/vacs 4 on the market today.

Figure 11:
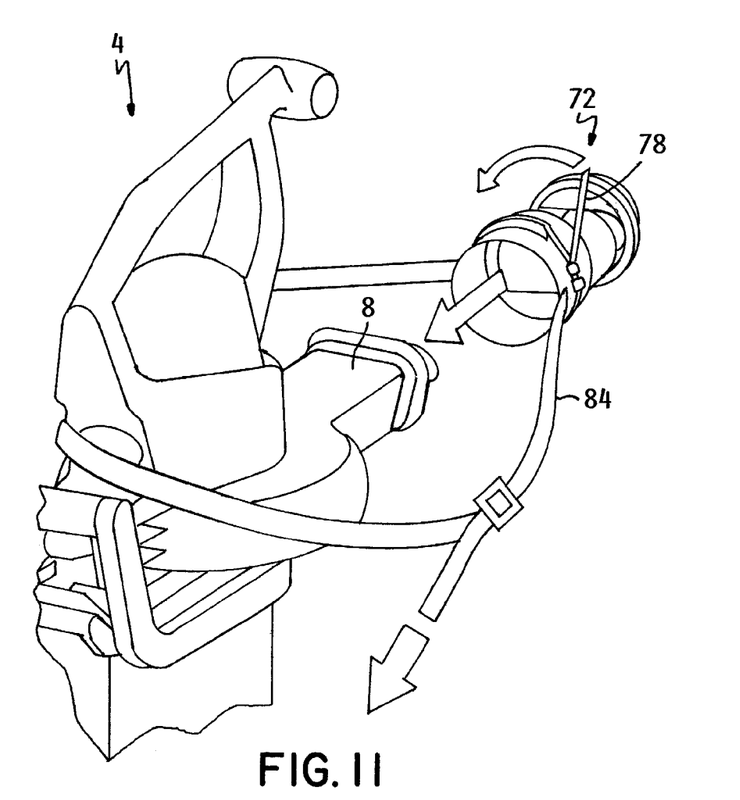
FIG. 11 is a perspective view showing the installation of the universal adapter of FIG. 10 to a blower/vac.
Figure 12:
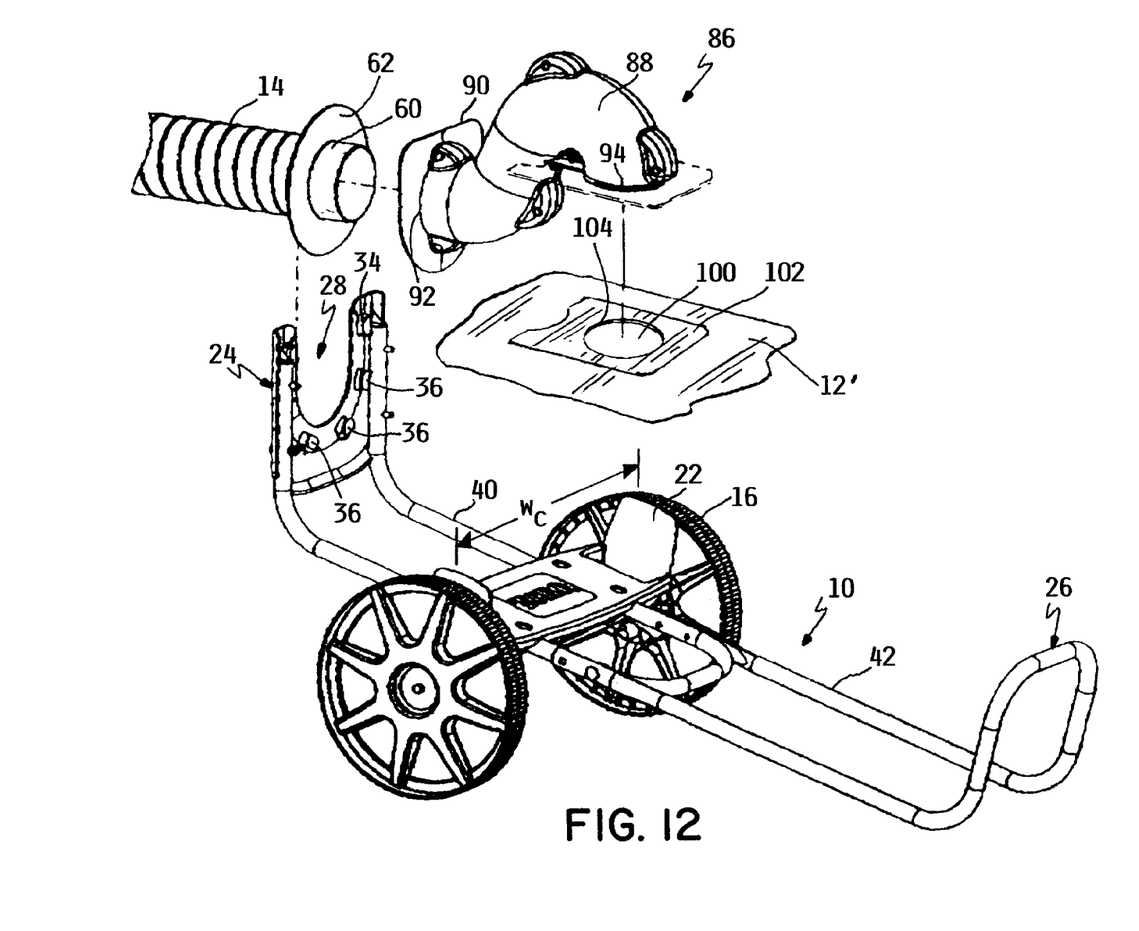
FIG. 12 is a perspective view of portions of the debris collection system of FIG. 1, particularly illustrating the use of an accessory comprising an S-shaped spout for connecting a disposable collection bag to the wheeled cart, a portion of the disposable collection bag being shown beneath the S-shaped spout prior to the attachment of the disposable collection bag to the S-shaped spout.
Figure 13:
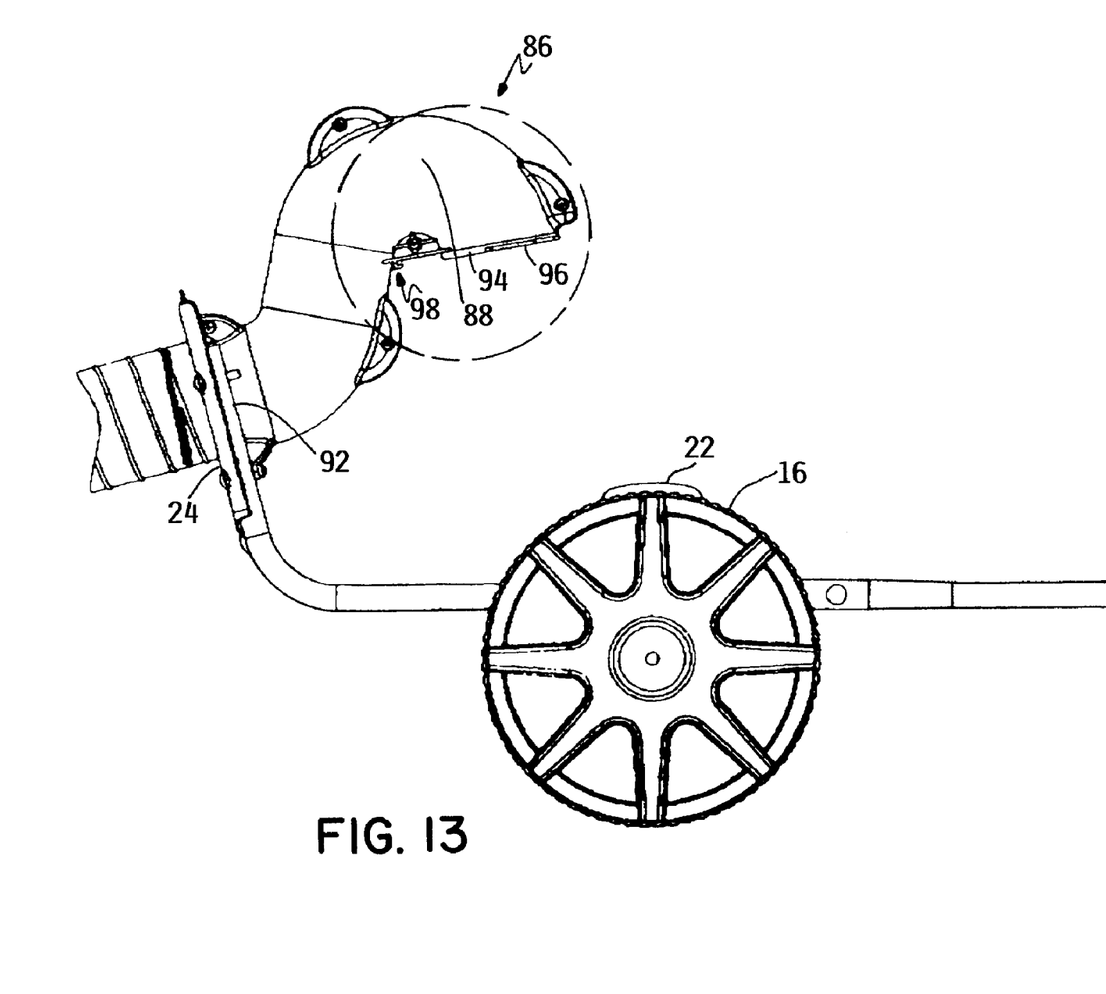
FIG. 13 is a side elevation view of portions of the debris collection system of FIG. 1, particularly illustrating the S-shaped spout of the disposable bag accessory being coupled to the connecting hose and being installed on the front end of the wheeled cart but without a disposable bag having been attached to the wheeled cart.

The clamping force of compressible sleeve 76 against fan outlet 8 of a non-Toro blower vac 4 may not be enough to securely affix universal adapter 72 to fan outlet 8. Thus, an additional and longer strap 84 is desirably provided on universal adapter 72 oriented in a generally horizontal plane. Additional strap 84 may be looped and tightened around the motor housing of blower/vac 4 to additionally secure universal adapter 72 to blower/vac 4 if need be. See FIG. 11.

The Disposable Collection Bag Accessory

Collection bag 12 described thus far in this patent application is designed to be reusable. However, a disposable collection bag accessory 86 can be provided for use with debris collection system 2 of this invention. Accessory 86 would allow cart 10 to hold disposable collection bags 12' which when filled would be removed and discarded in the nature of a disposable vacuum cleaner bag. A new disposable collection bag 12' would be installed in place of the disposable collection bag 12' that has just been discarded.

The disposable collection bag accessory 86 comprises a removable discharge spout 88 that is connected to rear end 60 of connecting hose 14 and to cart 10 in much the same way as collection bag 12. Spout 88 includes an attachment flange 90 surrounding a circular inlet 92. The size of attachment flange 90 and the diameter of circular inlet 92 on spout 88 are the same as the size of attachment flange 48 and the diameter of circular inlet 46 in collection bag 12. Thus, rear end 60 of connecting hose 14 can be inserted through inlet 92 on spout 88 to connect connecting hose 14 to spout 88 until attachment plate 62 on connecting hose 14 abuts with attachment flange 90 on spout 88. After this is done, the abutted attachment plate 62 and attachment flange 92 are installed on cart 10 by sliding them down into slideway 38 just as was described with respect to the reusable collection bag 12.

Spout 88 is generally S-shaped and is provided with a circular, downwardly facing outlet 94. The rim of outlet 94 is provided with small outwardly extending ribs 96. In addition, spout 88 includes a slot 98 that is generally coplanar with outlet 94 with slot 98 facing outlet 94. Ribs 96 on the rim of outlet 94 and slot 98 facing outlet 94 form an attachment for disposable collection bag 12'.

A disposable collection bag 12' is provided which is formed much like a disposable vacuum cleaner bag. Disposable collection bag 12' is made of uncoated paper or the like that is permeable to the passage of air. Collection bag 12' is provided with a circular opening 100 in the top of disposable collection bag 12'. A cardboard attachment member 102 has a similar circular opening 104 that mates with opening 100 in the top of disposable collection bag 12'. Attachment member 102 is secured to and is part of disposable collection bag 12'.

Figure 14:
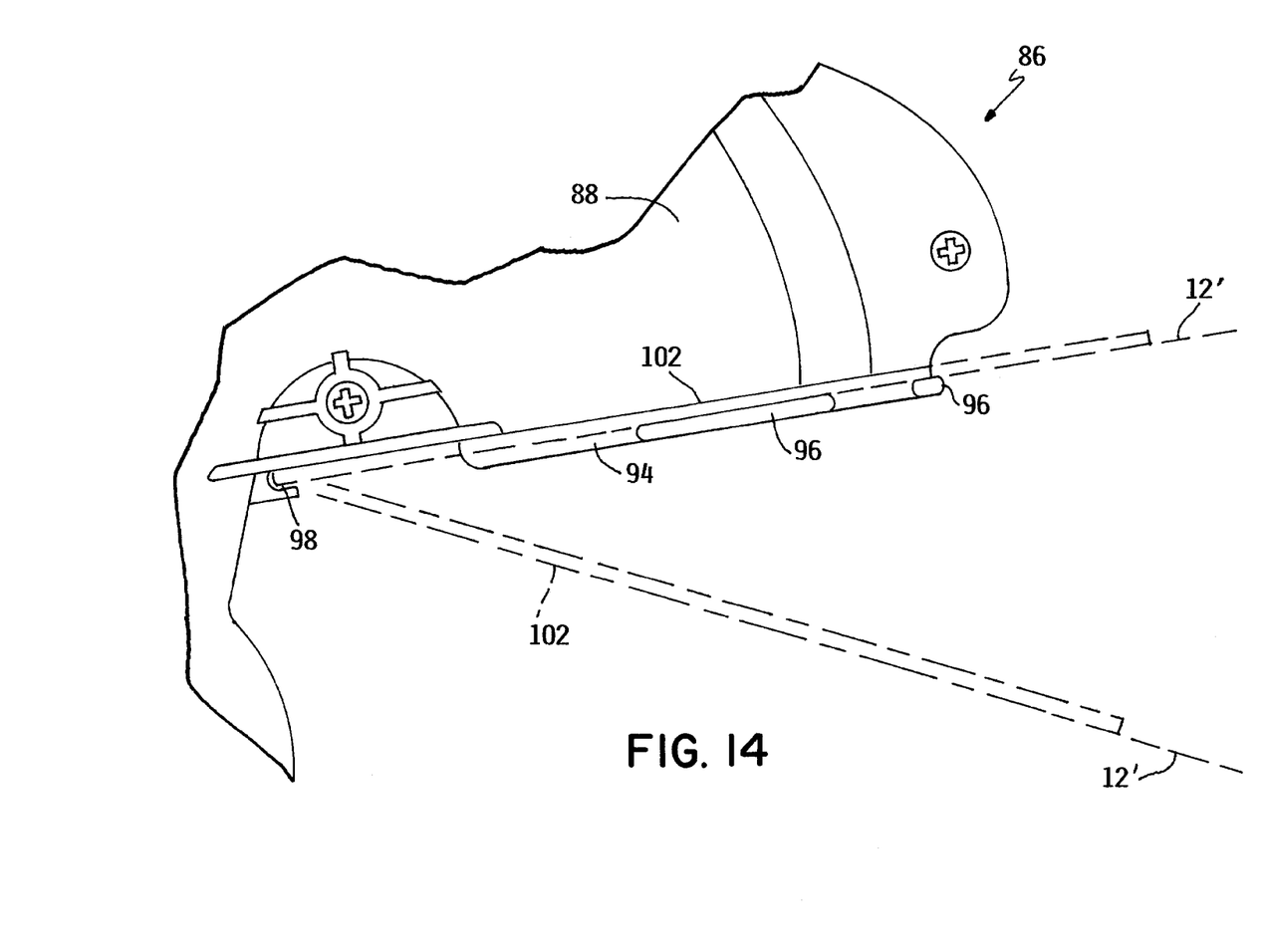
FIG. 14 is an enlarged side elevational view of the circled portion of FIG. 13, particularly showing the outlet of the S-shaped spout and the hook and how the attachment member of the disposable bag is coupled thereto with the attachment member and disposable bag being illustrated in phantom.

Attachment member 102 and outlet 94 of spout 88 are designed to fit together just like a disposable vacuum cleaner bag fits on an upright vacuum cleaner. Once disposable collection bag 12' is unfolded, the user takes cardboard attachment member 102 and places attachment member 102 beneath outlet 94 of spout 88. The user first inserts one edge of attachment member 102 into slot 98 to help hold attachment member 102 on spout 88 and to help align opening 104 in attachment member 102 with outlet 94 on spout 88. The user can then push up on the sides of attachment member 102 to push attachment member 102 up onto outlet 94 of spout 88. In this regard, attachment member 102 is sufficiently deformable around opening 104 in attachment member 102 to allow attachment member 102 to be pushed up past ribs 96 on the rim of outlet 94. Thus, attachment member 102 will be removably retained on outlet 94 of spout 88 both by ribs 96 engaging beneath attachment member 102 as well as slot 28. See FIG. 14.

The body of disposable collection bag 12' will hang downwardly from attachment member 102. Preferably, disposable collection bag 12' will be about the same size and shape as collection bag 12. Thus, when disposable collection bag 12' is inflated by the air stream passing into the bag through spout 88, it will extend over cart 10 between front and rear ends 24 and 26 of cart 10 and between side walls 22 of cart 10. Obviously, due to the flexible nature of the paper comprising disposable collection bag 12', bag 12' will deform as needed to fit beneath spout 88.

In any event, once disposable collection bag 12' is installed, blower/vac 4 may be turned on and disposable collection bag 12' will eventually become filled with debris. Once this occurs, the user can remove disposable collection bag 12' merely by gripping attachment member 102 and by pulling attachment member 102 down off outlet 94 of spout 88 and then by pulling attachment member 102 out of slot 98. The entire disposable collection bag 12' including the integral attachment member 102 is simply disposed of. The user than takes a new and fresh disposable collection bag 12', unfolds and shakes the bag 12' out somewhat, and then installs the new disposable collection bag 12' on spout 88 in the manner described above.

Accessory 86 involving the use of disposable collection bags 12' will be preferred by some users due to the fact that collection bag 12' need not be emptied after it is filled but can simply be thrown away. The user will, however, have to purchase and keep on hand a sufficient supply of disposable collection bags 12' to allow disposable collection bag 12' to be replaced when necessary.

Other Modifications

Various other modifications of this invention will be apparent to those skilled in the art. For example, collection bags 12 and 12' have been described as being made of materials that are permeable to the passage of air. While this is preferred, air could be allowed to escape or exit from collection bags 12 and 12' through other means, such as by using spaced holes or air filters in bags that are otherwise made from an air impermeable material.

In addition, the use of the term "collection bag" herein is not limited to the preferred embodiment comprising a flexible bag that is able to contract and expand. Thus, the term "collection bag" as used herein is intended to also cover a receptacle or container that might be made from a rigid or mostly rigid material or a combination of rigid and flexible materials. For collection bags made of rigid or mostly rigid materials, the use of a zipper to releasably close and open a disposal opening in collection bag 12 would be replaced by some other suitable means for closing and opening the disposal opening.

Moreover, the size and shape of cart 10 and of collection bag 12 can obviously vary from what is shown herein.

Thus, the scope of this invention is to be limited only by the appended claims.

We claim:

1. A debris collection system for use with a portable blower/vac having a fan outlet through which debris is ejected when the blower/vac is operated in a vacuum mode, which comprises:
   (a) a collection bag that in a debris collection mode is sufficiently enclosed except for a debris receiving inlet such that debris passing through the inlet is collected and retained within the collection bag, the collection bag having a longest dimension;
   (b) a connecting hose releasably coupling the inlet of the collection bag to the fan outlet of the blower/vac;
   (c) a wheeled cart for releasably receiving the collection bag and for supporting the collection bag in the debris collection mode with the longest dimension of the collection bag extending more horizontally than vertically, the collection bag being detachable from the cart in a debris disposal mode; and
   (d) wherein the cart has front and rear ends that are spaced apart from one another, and wherein the longest dimension of the collection bag fits between the front and rear ends of the cart.

2. The debris collection system of claim 1, wherein the collection bag has a front end and a rear end which lie respectively adjacent the front and rear ends of the cart when the longest dimension of the collection bag is fitted between the front and rear ends of the cart.

3. The debris collection system of claim 2, wherein the cart has laterally spaced, upwardly extending side walls, and wherein the collection bag has a shorter dimension that fits between the side walls of the cart when the longest dimension of the collection bag is fitted between the front and rear ends of the cart.

4. The debris collection system of claim 3, wherein the side walls of the cart lie inboard of the wheels of the cart.

5. The debris collection system of claim 2, wherein the front and rear ends of the collection bag are releasably secured to the front and rear ends of the cart when the collection bag is supported on the cart.

6. The debris collection system of claim 5, wherein the front end of the collection bag is releasably secured to the front end of the cart by an attachment flange on the collection bag releasably received in a slideway on the front end of the cart.

7. The debris collection system of claim 5, wherein the rear end of the collection bag is releasably secured to the rear end of the cart by a strap on the rear end of the collection bag slipped around the rear end of the cart.

8. The debris collection system of claim 1, wherein the collection bag is a reusable collection bag made of a relatively permanent fabric material, the collection bag being configured to allow air to pass out of the collection bag as the collection bag collects debris in the debris collection mode.

9. A debris collection system for use with a portable blower/vac having a fan outlet through which debris is ejected when the blower/vac is operated in a vacuum mode, which comprises:
   (a) a collection bag that in a debris collection mode is sufficiently enclosed except for a debris receiving inlet such that debris passing through the inlet is collected and retained within the collection bag, the collection bag having a longest dimension, wherein the collection bag is made of a flexible material to allow the collection bag to collapse and expand;
   (b) a connecting hose releasably coupling the inlet of the collection bag to the fan outlet of the blower/vac;
   (c) a wheeled cart for releasably receiving the collection bag and for supporting the collection bag in the debris collection mode with the longest dimension of the collection bag extending more horizontally than vertically, the collection bag being detachable from the cart in a debris disposal mode; and
   (d) wherein a zippered opening is provided in the collection bag to allow the zippered opening to be unzipped to empty the collection bag of collected debris in the debris disposal mode.

10. The debris collection system of claim 1, wherein the longest dimension of the collection bag extends substantially more horizontally than vertically when the collection bag is received on the cart in the debris collection mode.

11. A debris collection system for use with a portable blower/vac having a fan outlet through which debris is ejected when the blower/vac is operated in a vacuum mode, which comprises:
   (a) a collection bag;
   (b) a connecting hose releasably coupling the collection bag to the fan outlet of the blower/vac;
   (c) a wheeled cart for releasably receiving the collection bag and for supporting the collection bag for movement over the ground; and
   (d) wherein the connecting hose is coupled to the cart at a location that allows the cart to be pulled by the connecting hose and to roll and trail behind the blower/vac as a user operates the blower/vac and walks forwardly with the blower/vac.

12. The debris collection system of claim 11, wherein the connecting hose is coupled to one end of the cart.

13. The debris collection system of claim 12, wherein the cart has a pair of wheels that rotate on a common axis for rolling the cart over the ground, and wherein the wheels are located closer to the one end of the cart to which the connecting hose is coupled than to an opposite end of the cart.

14. The debris collection system of claim 11, wherein the cart is configured to roll on the ground and trail behind the blower/vac in the manner of a canister vacuum cleaner as a user operates the blower/vac and walks forwardly with the blower/vac with a longest dimension of the collection bag being substantially more horizontal than vertical.

* * * * *